United States Patent
Möller et al.

(10) Patent No.: US 12,032,678 B2
(45) Date of Patent: Jul. 9, 2024

(54) INFORMATION PROCESSING ARCHITECTURE FOR IMPLEMENTATION IN A VEHICLE

(71) Applicant: Airbus Operations GmbH, Hamburg (DE)

(72) Inventors: Kai Möller, Hamburg (DE); Christian Groth, Hamburg (DE); Sören Hübner, Hamburg (DE); Oliver Schalke, Hamburg (DE); René Niedermowe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 511 days.

(21) Appl. No.: 17/215,140

(22) Filed: Mar. 29, 2021

(65) Prior Publication Data

US 2021/0303676 A1    Sep. 30, 2021

(30) Foreign Application Priority Data

Mar. 31, 2020   (DE) .......................... 102020204148.2

(51) Int. Cl.
  *G06F 21/53*    (2013.01)
  *G06F 9/455*    (2018.01)
  *G06F 16/178*   (2019.01)

(52) U.S. Cl.
  CPC .......... *G06F 21/53* (2013.01); *G06F 9/45558* (2013.01); *G06F 16/178* (2019.01); *G06F 2221/033* (2013.01)

(58) Field of Classification Search
  CPC .... G06F 21/53; G06F 9/45558; G06F 16/178; G06F 2221/033; G06F 2221/2105; H04L 63/02; H04L 67/1095
  See application file for complete search history.

(56) References Cited

U.S. PATENT DOCUMENTS

| 7,496,666 B2 | 2/2009 | Bates et al. |
| 7,756,145 B2 | 7/2010 | Kettering et al. |

(Continued)

FOREIGN PATENT DOCUMENTS

| CA | 2628826 A1 * | 10/2007 | ........... H04L 49/604 |
| DE | 102013203841 A1 | 9/2014 | |

(Continued)

OTHER PUBLICATIONS

German Search Report; priority document.

*Primary Examiner* — Lynn D Feild
*Assistant Examiner* — Abdullah Almamun
(74) *Attorney, Agent, or Firm* — Greer, Burns & Crain, Ltd.

(57) ABSTRACT

An information processing architecture for implementation in a vehicle includes a software segregation unit which is configured to provide a first security domain and a second security domain which are assigned in each case to different operational areas of the vehicle and have their own data processing environments which are segregated from one another to run a multiplicity of computer applications. The software segregation unit is further configured to provide a synchronization instance, wherein the synchronization instance has a central dataset which is synchronized with data generated in the respective security domains independently from one another via data exchange and is selectively readable by both security domains.

9 Claims, 1 Drawing Sheet

(56) References Cited

U.S. PATENT DOCUMENTS

| | | | |
|---|---|---|---|
| 8,806,579 B1* | 8/2014 | Angus | G06F 9/5061 |
| | | | 726/4 |
| 8,826,285 B2 | 9/2014 | Beltrand | |
| 9,694,903 B2 | 7/2017 | Beltrand | |
| 9,854,043 B2 | 12/2017 | Riedel | |
| 10,320,909 B2 | 6/2019 | Riedel | |
| 10,375,087 B2 | 8/2019 | Kirk et al. | |
| 10,609,029 B2 | 3/2020 | Leconte et al. | |
| 2005/0171816 A1* | 8/2005 | Meinert | G06Q 30/02 |
| | | | 705/3 |
| 2006/0031301 A1* | 2/2006 | Herz | G06F 21/6254 |
| | | | 709/206 |
| 2007/0183435 A1* | 8/2007 | Kettering | H04L 49/604 |
| | | | 370/463 |
| 2007/0240222 A1* | 10/2007 | Tuvell | H04W 12/128 |
| | | | 726/24 |
| 2008/0162518 A1* | 7/2008 | Bollinger | G06F 16/2465 |
| 2008/0301570 A1* | 12/2008 | Milstead | G06F 16/29 |
| | | | 726/14 |
| 2013/0151685 A1* | 6/2013 | Bursell | H04L 49/70 |
| | | | 709/223 |
| 2016/0335459 A1* | 11/2016 | Kling | G06F 21/74 |
| 2018/0365265 A1* | 12/2018 | Blanc | G08G 5/003 |
| 2019/0362075 A1 | 11/2019 | Kriz | |
| 2021/0160285 A1* | 5/2021 | Smith, II | G06F 21/602 |
| 2021/0334368 A1* | 10/2021 | Garvey | G06F 9/45558 |

FOREIGN PATENT DOCUMENTS

| | | |
|---|---|---|
| EP | 2819317 B1 | 12/2014 |
| EP | 2887021 B1 | 6/2015 |
| EP | 2978187 A1 | 1/2016 |
| EP | 3139548 B1 | 3/2017 |
| EP | 1961166 B1 | 8/2018 |

* cited by examiner

INFORMATION PROCESSING ARCHITECTURE FOR IMPLEMENTATION IN A VEHICLE

CROSS-REFERENCES TO RELATED APPLICATIONS

This application claims the benefit of the German patent application No. 102020204148.2 filed on Mar. 31, 2020, the entire disclosures of which are incorporated herein by way of reference.

FIELD OF THE INVENTION

The present invention relates to an information processing architecture for implementation in a vehicle.

BACKGROUND OF THE INVENTION

Although usable in a wide range of applications, the present invention and its underlying problems are explained in detail with reference to passenger aircraft. However, the described methods and devices can equally be used in different vehicles and in all sectors of the transport industry, for example for road vehicles, for rail vehicles, for aircraft or for watercraft.

Today, a plurality of networks which can have a plurality of segregated (separate) domains and/or areas are typically provided on board passenger aircraft. Here, each domain (or network domain) normally comprises a subset of components or devices of the respective network which can be connected, for example, to a central server. For security reasons, these domains on board aircraft can be more or less strictly segregated from one another in terms of hardware and/or software.

The ARINC 811 standard from Aeronautical Radio Incorporated (ARINC), for example, concerns information security concepts as they relate to airborne networks and provides a framework for evaluating the security of airborne networked systems. Three domains are defined here:

Aircraft Control Domain (ACD),
Airline Information Service Domain (AISD), and
Passenger Information and Entertainment Service Domain (PIESD).

The ACD domain comprises avionics and aviation safety and security functions, AISD provides administrative support for airlines (on-board service, maintenance, etc.) and PIESD deals with aspects relating to communication with passengers and their entertainment (e.g., in-flight entertainment (IFE)). Different security levels are naturally assigned to these domains, wherein ACD has the highest security level. Conversely, the AISD domain tends to be a more open domain in relation thereto which deals with both technical and commercial operational details which on-board personnel frequently access.

Due to regulatory requirements, intercommunication between these aircraft domains (avionics, operations, passengers) is strictly limited. Examples of the technical implementation of communication between these domains can be found in documents U.S. Pat. No. 8,826,285 B2, EP 2 887 021 B1, EP 2 819 317 B1, EP 3 139 548 B1 and EP 1 961 166 B1. It may sometimes be costly to adapt existing concepts to new communication flows due to restrictions of this type. New interfaces, for example, between devices which are located in different domains may require either new hardware or certified software modifications in order to exchange information and still meet the necessary security requirements.

SUMMARY OF THE INVENTION

Against this background, an object of the present invention is to find solutions for communication between different vehicle domains which are readily adaptable to individual requirements and nevertheless guarantee the security needs of the domain segregation.

An information processing architecture is provided accordingly for implementation in a vehicle. The information processing architecture comprises a software segregation unit which is designed to provide a first security domain and a second security domain which are assigned, in each case, to different operational areas of the vehicle and have their own data processing environments which are segregated from one another to run a multiplicity of computer applications; wherein the software segregation unit is further designed to provide a synchronization instance, wherein the synchronization instance has a central dataset which is synchronized with data generated in the respective security domains independently from one another by means of data exchange and is selectively readable by both security domains.

An aircraft or spacecraft is further provided with an information processing architecture according to the invention.

One underlying idea of the present invention comprises providing an indirect communication channel between the domains, wherein no direct communication is permitted between the domains, but only an intermediate instance is entrusted with the task of regulating an indirect data exchange by synchronizing the data of the two domains. This can be performed, for example, on the basis of a well-defined set of rules which defines how precisely the data are synchronized, e.g., how/whether the data are checked and, if necessary, filtered.

Specifically, a controlled bidirectional data transfer is thus enabled via this intermediary instance, wherein the communication is performed by means of data synchronization without a direct interaction taking place between the applications of the domains. This solution of the invention can obviously also be used for the interaction between more than two domains.

The synchronized data can be stored and/or buffered in the synchronization instance so that the synchronization instance contains a copy of the data of both domains as a result. In other words, the synchronization instance therefore contains data from both connected domains and the associated applications. From there, the domains can access the stored data elements and use them for further processing, wherein this data access can be tailored and regulated in a domain-specific or even application-specific manner. The synchronization instance between the two domains can be implemented, for example, by means of database services.

The basic structure of the communication, i.e., in particular, the synchronization instance and its associated set of rules, can essentially remain here under the control of the vehicle manufacturer (e.g., an aircraft manufacturer), whereas third-party providers can have access only to the applications in the domains. Individual transaction procedures can thus be handled on the basis of specially adapted sets of rules which are predefined by the vehicle manufacturer and therefore contain regulation and security requirements. Unauthorized access, for example, can be strictly refused by the synchronization instance in order to retain a secure state of the system. At the same time, application-related aspects can be adapted easily and quickly through simple configuration changes modifiable by the user (e.g., by airlines in the case of aircraft). This can result in significantly shorter and more economical development cycles in the case where new applications are to be implemented between the domains.

According to one development, the synchronization instance can be connected via a first network connection to the first security domain and via a second network connection to the second security domain.

According to one development, the security domains can store their data in a respectively associated database and the central dataset is stored in a central database.

Both central and local or distributed storage concepts can obviously be used here, wherein the data can be stored permanently and/or only temporarily.

According to one development, the central database can in each case comprise a copy of the databases of the security domains. The copies can be synchronized here independently from one another with the database of the respective security domain.

The data to be exchanged can be suitably structured here in order to guarantee an acceptable level of security between the domains. The data can, for example, be subdivided into datasets which are then classified or bundled according to subject-matter and are structured as an information tree. A filtering of the data, for example, can thereby be enabled. Read and write access permissions can be allocated to these datasets individually per domain. In addition, Quality of Service (QoS) levels can be defined in order to prioritize different data sets in relation to one another. In the case of changed requirements for the data flows, the data structuring (e.g., an information tree) can easily be adapted, wherein this can be done differently for the different domains. Depending on requirements, the entire tree or the entire data structure can be jointly used, i.e., read out or authorized for write operations, by both domains. Alternatively, read and/or write permissions can be allocated for specific data only, wherein this can be handled differently for the different domains.

According to one development, the copies of the databases of the security domains can be synchronized at regular time intervals.

The data can be synchronized, for example, at intervals of one or more seconds or minutes. Alternatively or additionally, however, a synchronization of the data can equally take place only following the occurrence of a specific event, e.g., the start of a specific application or the occurrence of a specific scenario.

If the copy of the data from one of the security domains (e.g., a higher-value domain) happens to be modified in the respective other domain (e.g., a lower-value domain) due to an error and/or attack, these data can be reset automatically to a correct state in a suitable time.

According to one development, the first security domain, the second security domain and the synchronization instance can be designed in each case as an independent virtual machine.

The domains and the synchronization instance can thus be encapsulated within the network entirely through software, wherein each of these instances represents a separate virtual machine.

According to one development, the synchronization instance can exchange data with the security domains on the basis of one or more sets of rules which define access permissions for reading and/or writing the data and/or filter rules for the data exchange separately for the security domains.

The set(s) of rules can essentially be predefined here, for example, by a vehicle manufacturer and can be adapted to security requirements. On this basis, it can be provided that airlines, for example, define specific rules according to their respective business requirements. Not only a single set, but equally a plurality of, possibly hierarchically graduated, sets of rules can obviously be applied here.

According to one development, the first security domain can represent a vehicle system information domain which contains functions relating to operation, maintenance and/or crew members of the vehicle. The second security domain can represent a passenger information domain which contains functions relating to entertainment and communication of passengers of the vehicle.

The first security domain can thus, for example, be an aircraft control domain (ACD) or an airline information service domain (AISD), while the second security domain can represent a passenger information and entertainment service domain (PIESD). An indirect bidirectional data connection, in particular, can be established accordingly on the basis of the invention between the AISD and PIESD which, on one hand, is flexibly adaptable, but, on the other hand, guarantees a security segregation of the two domains.

According to one development, the vehicle system information domain can mediate a data exchange with vehicle operational devices and/or vehicle crew member devices. The passenger information domain can mediate a data exchange with passenger devices and/or infotainment devices.

A passenger can, for example, communicate via a passenger service unit (PSU) or via a portable electronic device with on-board personnel, e.g., to place an order. The data exchange taking place here is mediated via the PIESD domain, wherein specific data can be stored in a central data memory of the synchronization instance. On-board personnel can in turn receive and further process an order via corresponding stationary devices (e.g., a galley) or portable devices (e.g., a tablet or other portable computer). The data stream generated by these vehicle crew member devices is then managed via the AISD domain and synchronized with the central data memory of the synchronization instance. An order can be recorded in the central data memory, for example, through synchronization with the PIESD domain, wherein an application of the AISD domain regularly checks for a change in the corresponding data entry in the central data memory. As soon as a change of this type actually occurs, this is registered by the application of the AISD domain as an order and further processing steps are initiated, e.g., the creation of an order confirmation entry in the central data memory, on the basis of which the order is confirmed.

It is similarly possible for further devices of the vehicle, e.g., sensor systems and/or control elements of the vehicle, maintenance interfaces, etc., to be able to communicate or exchange data via the vehicle system information domain.

The above designs and developments can, where appropriate, be combined with one another in any way. Further possible designs, developments and implementations of the invention also comprise combinations, not explicitly specified, of features of the invention described above or below in relation to the example embodiments. In particular, the person skilled in the art will also add individual aspects as improvements or supplements to the respective basic form of the present invention.

BRIEF DESCRIPTION OF THE DRAWINGS

The present invention is explained in detail below on the basis of the example embodiments indicated in the schematic figures. In the figures.

DETAILED DESCRIPTION OF THE PREFERRED EMBODIMENTS

Figure 1:
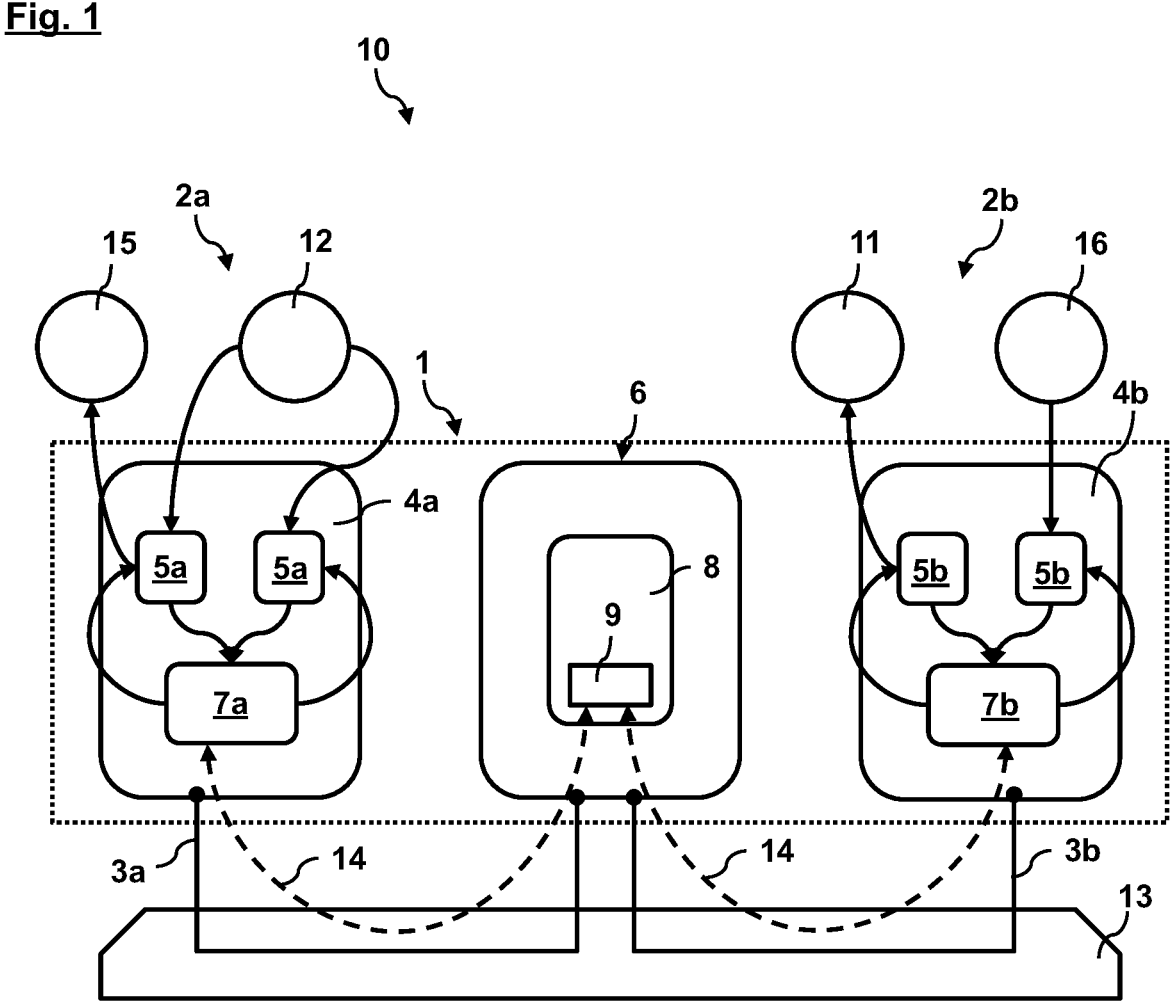
FIG. 1 shows a schematic view of an information processing architecture according to one embodiment of the invention.

The attached figures are intended to provide a further understanding of the embodiments of the invention. They illustrate embodiments and, together with the description, serve to explain the principles and concepts of the invention. Other embodiments and many of the aforementioned advantages are shown in the drawings. The elements of the drawings are not necessarily shown to scale in relation to one another.

Unless otherwise stated, similar, functionally similar or similarly acting elements, features and components are denoted in each case with the same reference numbers in the figures of the drawing.

Figure 2:
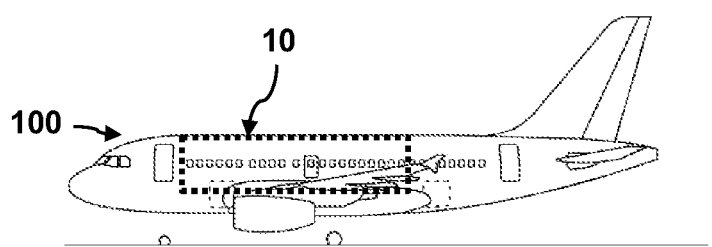
FIG. 2 shows a schematic side view of an aircraft with the information processing architecture from FIG. 1.

FIG. 1 shows a schematic view of an information processing architecture 10 according to one embodiment of the invention which is installed in an aircraft 100, e.g., the passenger aircraft shown by way of example in FIG. 2.

The network structure of a passenger aircraft of this type is typically subdivided into at least three network domains or data domains which differ from one another in terms of criticality and connection requirements. The aircraft control domain (ACD) is the most critical of all domains here with the highest security requirements, and manages all data specific to a safe operation of the aircraft. Due to the high criticality level, data must be accessible and exchanged at all times during the flight, in all places and in any weather or in the event of any anomaly.

The airline information service domain (AISD) similarly comprises data for the operation of the aircraft, but has no influence on the actual control of the aircraft, so that it is operationally important, but does not tend to be safety-critical. An AISD domain uses data which can influence the mode of operation of the airlines in order to increase the efficiency of the operational process from the cabin through to the flight crew. They enable the airlines, inter alia, to perform and manage updates effectively across entire fleets. It must be reliably ensured here that data relating to weather conditions, reports on engine and system performance, maintenance information, sensor measurements and information relating to possible technical problems are available and analysable at all times. This means, inter alia, that the AISD domain must be segregated from a passenger-related domain and the corresponding networks.

The aforementioned third domain (PIESD) relates to passenger entertainment and passenger communication and can comprise a plurality of interconnected systems, such as, e.g., passenger devices, transmission devices for passenger entertainment and the like, as well as the corresponding network structures for connecting devices of this type, for example via Wi-Fi.

In the example embodiment according to FIGS. 1 and 2, the information processing architecture 10 is used for secure communication between the AISD domain as the first security domain 2a and the PIESD domain as the second security domain 2b. This application is obviously to be understood here purely as an example and the information processing architecture according to the invention can also be used alternatively or additionally for secure communication between other domains on board a passenger aircraft or general aircraft, watercraft, land vehicle, etc.

The information processing architecture 10 comprises a software segregation unit 1, for example a computer server or the like on board the aircraft 100, on which the different domains 2a, 2b are implemented as independent virtual machines by means of virtualization. The different specific aircraft domains AISD and PIESD, and possibly ACD also, can essentially be segregated from one another, at least at software level, on this basis.

Each security domain 2a, 2b comprises its own data processing environment 4a, 4b to run a multiplicity of computer applications 5a, 5b. A vehicle device 12, e.g., a sensor, can thus communicate in the first security domain 2a with a first computer application 5a or can provide its generated data for said computer application 5a. In a further example, a vehicle crew member device 15, e.g., a portable computer of the on-board personnel, an operating element of a galley or a maintenance interface of the airline, can be in contact with a first computer application 5a. In the case of the second security domain 2b, a passenger device 11, for example, such as a portable computer, a mobile radio device or the like can interact via a wireless network connection with the second computer application 5b, e.g., to place an order for a consumer item. In a different example, entertainment media, for example, can be requested via an infotainment device 16, wherein the infotainment device 16 is similarly incorporated into the data processing environment 4b of the second security domain 2b and can interact with corresponding second computer applications 5b. Generated data are stored by both security domains 2a, 2b in a database 7a, 7b which is integrated into and/or connected to the respective data processing environment 4a, 4b.

The present solution now pursues the basic idea of providing an additional virtual machine specifically for the indirect data exchange and a secure communication between the security domains 2a, 2b. For this purpose, the software segregation unit 1 is designed to provide a synchronization instance 6 as a further independent virtual machine which is connected via a first network connection 3a of a network 13 to the first security domain 2a and via a second network connection 3b of the network 13 to the second security domain 2b.

Regulatory and technical security considerations prohibit a direct communication between these two domains 2a, 2b. Correspondingly, a direct data exchange between the two security domains 2a, 2b is currently prohibited. Instead, an indirect bidirectional data exchange is enabled, whereby the synchronization instance 6 in each case stores a copy of the databases 7a, 7b of the security domains 2a, 2b on a central database 8 and synchronizes the respective copy with the databases 7a, 7b of the security domains at regular time intervals and/or on demand. The synchronization takes place here for both security domains 2a, 2b independently from one another.

The central database 8 is selectively readable by both security domains 2a, 2b. Access rights for reading and writing the data are defined here by a defined set of rules 9 (or a plurality of, possibly hierarchically graduated, sets of rules) in the synchronization instance 6. This fundamental set of rules can, for example, be prescribed by an aircraft manufacturer and can additionally define filter rules for the data exchange, QoS conditions, etc. In this sense, the synchronization instance 6 thus contains a copy of the relevant data of both security domains 2a, 2b. A direct data exchange between the security domains 2a, 2b is not possible, but both security domains 2a, 2b can in each case indirectly access the data of the other domain. The central dataset on the central database 8 is subject here to regulation by the synchronization instance 6. This means, for example, that the dataset can be adapted individually for each security domain 2a, 2b before being disseminated or made visible. The synchronization instance 6 can, for example, refuse any unauthorized access in order to avoid compromising the secure state of the system as a whole. An exchange of critical data can thus be prevented.

In one specific example, a passenger can run a computer application 5b via a passenger device 11 to place an order for a consumer item within the second security domain 2b. The associated data are then stored on the central database 8 through synchronization with the database 7b. A computer application 5a which queries the database 7a (which is synchronized with the central database 8) at regular intervals to determine whether an order has been placed, i.e., whether the corresponding database entry has been changed, can be run simultaneously in the first security domain 2a. As soon as the order data are synchronized with the central database 8, the computer application 5a in the first security domain 2a can thus recognize this and further process the order.

Passenger applications which run in the second security domain 2b, but are simultaneously reliant on data from the first security domain 2a, e.g., sensor data generated by devices in the first security domain 2a, can thus access these data accordingly through the mediation of the synchronization instance 6 without the security segregation of the two domains 2a, 2b being undermined as a result.

In the case where new data flows between the security domains 2a, 2b are to be defined, a structuring of the central dataset on the central database 8 can easily be adapted in order to adapt the flow of the data in both directions in a suitable manner. The computer applications 5a, 5b can also be adapted accordingly in the data processing environments 4a, 4b. The fundamental rule structure of the set of rules 9 for meeting the security requirements of the aircraft manufacturer can be defined here.

In the preceding detailed description, different features have been combined in one or more examples to improve the rigour of the representation. However, it should be obvious that the above description is merely illustrative and in no way of a restrictive nature. It serves to cover all alternatives, modifications and equivalents of the different features and example embodiments. Many other examples will be immediately and directly obvious to the person skilled in the art due to his technical knowledge with regard to the above description.

The example embodiments have been selected and described in order to be able to illustrate the principles underlying the invention and their possible applications in practice. As a result, persons skilled in the art can optimally modify and use the invention and its different example embodiments in relation to the intended purpose. In the claims and the description, the terms "containing" and "having" are used as linguistically neutral concepts for the corresponding term "comprising". Furthermore, a use of the terms "a", "an" and "one" is essentially not intended to exclude a multiplicity of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMBER LIST

1 Software segregation unit
2a First security domain
2b Second security domain
3a First network connection
3b Second network connection
4a First data processing environment
4b Second data processing environment
5a First computer application
5b Second computer application
6 Synchronization instance
7a First database
7b Second database
8 Central database
9 Set(s) of rules
10 Information processing architecture
11 Passenger device
12 Vehicle device
13 Network
14 Synchronization
15 Vehicle crew member device
16 Infotainment device
100 Aircraft

The invention claimed is:

1. An information processing architecture for implementation in a vehicle, comprising:
   a software segregation unit which is configured to provide a first security domain and a second security domain which are assigned in each case to different operational areas of the vehicle and have their own data processing environments which are segregated from one another to run a multiplicity of computer applications;
   wherein the software segregation unit is further designed to provide a synchronization instance;
   wherein the synchronization instance has a central dataset which is synchronized with data generated in the respective security domains independently from one another by means of bidirectional data exchange and is selectively readable by both security domains, thereby allowing indirect data exchange between the first security domain and the second security domain, wherein the exchanged data comprises weather conditions, reports on engine and system performance, maintenance information, and sensor measurements and information; and
   wherein the synchronization instance exchanges data with the security domains based on one or more sets of rules which define access permissions for at least one of reading or writing the data or filter rules for the data exchange separately for the security domains.

2. The information processing architecture according to claim 1, wherein the synchronization instance is connected via a first network connection to the first security domain and via a second network connection to the second security domain.

3. The information processing architecture according to claim 1, wherein the security domains store their data in a respectively associated database and the central dataset is stored in a central database.

4. The information processing architecture according to claim 3, wherein the central database in each case comprises a copy of the databases of the security domains, wherein the copies are synchronized independently from one another with the database of the respective security domain.

5. The information processing architecture according to claim 4, wherein the copies of the databases of the security domains are synchronized at regular time intervals.

6. The information processing architecture according to claim 1, wherein the first security domain, the second security domain and the synchronization instance are configured in each case as an independent virtual machine.

7. The information processing architecture according to claim 1, wherein the first security domain represents a vehicle system information domain which contains functions relating to at least one of operation, maintenance or crew members of the vehicle, wherein the second security domain represents a passenger information domain which contains functions relating to entertainment and communication of passengers of the vehicle.

8. The information processing architecture according to claim 7, wherein the vehicle system information domain mediates a data exchange with at least one of vehicle operational devices or vehicle crew member devices, wherein the passenger information domain mediates a data exchange with at least one of passenger devices or infotainment devices.

9. An aircraft or spacecraft having an information processing architecture according to claim 1.

* * * * *